United States Patent Office 3,772,394
Patented Nov. 13, 1973

3,772,394
SEPARATION OF CHLOROPHENOLS
Malcolm Howard Milnes, Chesterfield, England, assignor to Coalite and Chemical Products Limited, Chesterfield, England
No Drawing. Filed Dec. 10, 1970, Ser. No. 97,031
Claims priority, application Great Britain, Dec. 12, 1969, 60,806/69
Int. Cl. C07c 39/30
U.S. Cl. 260—623 R          15 Claims

ABSTRACT OF THE DISCLOSURE

A mixture of polychlorophenols, particularly a mixture of two or more dichlorophenols, is separated at least in part by contact with an alkaline solution under conditions such that at least one of the polychlorophenols passes into the alkaline solution more readily than the other polychlorophenol or polychlorophenols. Furthermore, a mixture of dichlorophenols, particularly a mixture of the 2,3- and 2,6-isomers or a mixture of 2,5- 2,4- and 3,4-isomers, is selectively extracted with an aqueous alkaline solution. The alkaline solution may be an aqueous solution of a caustic alkali, for example, sodium hydroxide. Alternatively, the extractive solvent may be an aqueous solution of a mild alkali, for example, a carbonate, phosphate, acetate, silicate, borate or other suitable salt of a metal of Group I or II, for example sodium carbonate or trisodium phosphate. The extraction or separation is preferably but not essentially effected with the chlorophenols in solution in an inert solvent, for example a hydrocarbon or hydrocarbon fraction such as benzene, toluene or petroleum ether, or butyl acetate. The extraction is preferably carried out by contacting the alkaline solution countercurrently with the phase comprising the chlorophenols.

The chlorophenols may be recovered from the aqueous extract phase by acidification, for example, with hydrochloric acid or sulphuric acid, to liberate the chlorophenol with subsequent filtration to separate the liberated chlorophenol. Alternatively, the chlorophenol may be removed from the aqueous extract phase by a further solvent extraction. Thus, for example, 2,6-dichlorophenol contained in aqueous sodium carbonate as an extract from a solution of a mixture of 2,3- and 2,6-dichlorophenols in toluene, has been separated from the aqueous phase by countercurrent extraction with methyl isobutyl ketone in one instance and by butyl acetate in another instance.

---

The invention relates to a process for the separation of a mixture of chlorophenols, particularly a mixture of two or more dichlorophenols.

A mixture comprising 2,5- 2,4- and 3,4-dichlorophenols is obtained upon the hydrolysis of 1,2,4-trichlorobenzene and a mixture comprising 2,3- and 2,6-chlorophenols is obtained upon the hydrolysis of 1,2,3-trichlorobenzene. It is possible to eliminate 3,4-dichlorophenol from the first mixture by distillation but the mixture of 2,5- and 2,4-dichlorophenols so obtained is extremely difficult to separate physically in good yields. The same difficulty applies to the physical separation of the mixture of 2,6- and 2,3-dichlorophenols.

The $pK_a$ values of the isomeric phenols is spread over a wide range and the invention provides a process which utilises this fact in the separation of mixtures of dichlorophenols.

According to the invention a mixture of polychlorophenols, particularly a mixture of two or more dichlorophenols, is separated at least in part by contact with an alkaline solution under conditions such that at least one of the polychlorophenols passes into the alkaline solution more readily than the other polychlorophenol or polychlorophenols.

According to the invention furthermore, a mixture of dichlorophenols, particularly a mixture of the 2,3- and 2,6-isomers or a mixture of 2,5- 2,4- and 3,4-isomers, is selectively extracted with an aqueous alkaline solution.

The alkaline solution may be an aqueous solution of a caustic alkali, for example, sodium hydroxide. In such case, the amount of the caustic alkali used in preferably less than that equivalent to the total dichlorophenols with which the aqueous phase is contacted. The content of the caustic alkali in the aqueous solution may, for example, be conveniently up to 60% by weight, advantageously between 2.5 and 25% by weight and preferably between 5 and 12% by weight.

Alternatively, the extractive solvent may be an aqueous solution of a mild alkali, for example, a carbonate, phosphate, acetate, silicate, borate or other suitable salt of a metal of Group I or II, for example sodium carbonate or trisodium phosphate. The concentration of such mild alkali solution may be up to 60% by weight but is preferably from 5 to 25% by weight. Thus, for example, the alkaline solution used in the extraction may consist of a 5 to 12.5 wt. percent solution of sodium carbonate.

The extraction or separation is preferably but not essentially effected with the chlorophenols in solution in an inert solvent, for example a hydrocarbon or hydrocarbon fraction such as benzene, toluene or petroleum ether, or butyl acetate. In such solution, the concentration of the dichlorophenols is suitably at least 5% by weight and is preferably in the range 10–60% by weight, for example, 15–40% by weight.

The extraction is preferably carried out by contacting the alkaline solution countercurrently with the phase comprising the chlorophenols. Such countercurrent contacting may be carried out in a column packed with Raschig rings, Berl saddles or other suitable members. Preferably, however, the contacting is effected in a vessel through which the two phases flow countercurrently in a substantially horizontal direction, the vessel being provided with a rotor which, in operation, serves to bring the two phases into repeated contact by carrying portions of the heavier phase up into the lighter phase and vice versa. Suitable contactors of this kind are described and illustrated in British patent specifications Nos. 860,880, 972,035 and 1,037,573.

The contacting is suitably effected at a temperature in the range 0°–100° C. It is conveniently effected at or about ambient temperature, for example, at a temperature in the range 15–30° C.

The chlorophenol may be recovered from the aqueous extract phase by acidification, for example with hydrochloric acid or sulphuric acid, to liberate the chlorophenol with subsequent filtration to separate the liberated chlorophenol. Alternatively, the chlorophenol may be removed from the aqueous extract phase by a further solvent extraction. Thus, for example, 2,6-dichlorophenol contained in aqueous sodium carbonate as an extract from a solution of a mixture of 2,3- and 2,6- dichlorophenols in toluene, has been separated from the aqueous phase by countercurrent extraction with methyl isobutyl ketone in one instance and by butyl acetate in another instance.

The invention is illustrated in the following examples. The contactor employed was of a construction substantially as disclosed in British patent specification No. 1,037,573. The contactor was a laboratory size model of 4 inch diameter, that used in Examples 1, 2 and 4 having 10 stages (compartments) whilst that used in Example 3 had 20 stages. The rotor was operated at 14 r.p.m. and the extraction was in each example effected at an ambient temperature in the range 18–20° C. The flow rate for each phase through the contactor was in the range 3–5 litres per hour.

EXAMPLE 1

A 12.5% by wt. solution in petroleum ether (boiling range: 80–100° C.) of a mixture A was passed through the contactor countercurrent to an equal volume of 5% aqueous solution of caustic soda. The following Table 1 shows the composition by weight of mixture A and that of the worked up raffinate and extract phases. As may be seen from the table, an enrichment of 2,5-dichlorophenol occurred in the extract phase.

TABLE 1

|  | A | Raffinate | Extract |
|---|---|---|---|
| 2,5-dichlorophenol, percent | 29.7 | 26.2 | 47.1 |
| 2,4-dichlorophenol, percent | 30.9 | 29.0 | 18.3 |
| 2,6-dichlorophenol, percent | 11.5 |  | 20.9 |

EXAMPLE 2

A 36.5% by wt. solution in toluene of a mixture B was passed through the contactor against 2.5 times its volume of 10.6% sodium carbonate solution.

The aqueous extract phase was acidified with sulphuric acid to liberate the chlorophenols which were then filtered off and dried. The raffinate was distilled to remove the toluene. The compositions by weight of mixture B and of the raffinate and extract phases are shown in Table 2. The table also indicates that a separation of the 2,5- and 2,4-dichlorophenol isomers occurred.

TABLE 2

|  | B | Raffinate | Extract |
|---|---|---|---|
| 2,5-dichlorophenol, percent | 82.5 | 68.1 | 92.8 |
| 2,4-dichlorophenol, percent | 14.6 | 29.2 | 7.2 |

EXAMPLE 3

A 12.5% by wt. solution of a mixture C in toluene was passed through a 20 stage contactor countercurrent to an equal volume of 5% sodium carbonate solution. The chlorophenols in the aqueous extract phase and the residual chlorophenols in the toluene phase were isolated as in Example 2. The compositions by weight of mixture C and of the raffinate and extract phases are shown in Table 3. The table shows that in this case the 2,6-dichlorophenol is extracted and the 2,3-isomer passes through in the raffinate.

TABLE 3

|  | C | Raffinate | Extract |
|---|---|---|---|
| 2,6-dichlorophenol, percent | 47.5 | 8.5 | 99.0 |
| 2,3-dichlorophenol, percent | 46.4 | 91.5 | 1.0 |

EXAMPLE 4

150 lbs. of a mixture D of 2,3- and 2,6-dichlorophenols was diluted with toluene to a 36% w./w. mixture and passed countercurrent to 2.33 times its volume of 10% sodium carbonate through a 10 stage contactor with an agitation speed of 14 r.p.m. On working up the respective phases as described in Example 2, 39 lbs. of phenols were obtained from the raffinate and 67 lbs. from the extract phase, the compositions by weight of the two dichlorophenols in the initial mixture D and in the raffinate and extract phases are shown in Table 4. Pure 2,3- and 2,6-dichlorophenols (M.P. 57–58° C. and 65–66° C. respectively) were obtained from the raffinate and extract mixture respectively after crystallisation from petroleum ether (boiling range: 80–100° C.).

TABLE

|  | D | Raffinate | Extract |
|---|---|---|---|
| 2,6-dichlorophenol, percent | 51.2 | 14.0 | 84.0 |
| 2,3-dichlorophenol, percent | 36.4 | 81.0 | 16.0 |

As hereinbefore stated, Examples 1 to 4 were carried out at flow rates of 3 to 5 litres per hour of each phase. When somewhat higher flow rates were used, there was a marginal decrease in the separation obtained.

The examples were repeated at temperatures above ambient, for example 50° C., but the use of elevated temperature afforded no improvement.

With the same feed treated under the same conditions, the greater the number of stages in the contactor, the better the degree of separation will normally be. Better separation was also obtained when the rotor speed was increased, but this improvement was off-set to some extent by difficulty of operation.

I claim:

1. A method of obtaining an enrichment of 2,5-dichlorophenol over 2,4-dichlorophenol in a mixture comprising said isomeric dichlorophenols which comprises contacting the mixture with an aqueous alkaline solution of a caustic alkali in a concentration of 2.5%–60% by weight of the solution, or with an aqueous alkaline solution of a salt of the class of carbonates, phosphates, acetates, silicates or borates of a metal of Group I or II of the Periodic Chart of the Elements in a concentration of 5%–60% by weight of the solution, the contacting being carried out at a temperature range of 0°–100° C., whereby the 2,5-dichlorophenol is preferentially extracted into the aqueous alkaline solution.

2. A method in accordance with claim 1 wherein the said 2,5-dichlorophenol present in the aqueous alkaline solution is recovered by acidification and subsequent filtration.

3. A method in accordance with claim 1 wherein the said 2,5-dichlorophenol present in the aqueous alkaline solution is recovered by extraction with methyl isobutyl ketone or with butyl acetate.

4. A method in accordance with claim 1 wherein the said aqueous alkaline solution is an aqueous solution of sodium hydroxide.

5. A method in accordance with claim 1 wherein the said aqueous alkaline solution is a 5%–12.5% by weight aqueous solution of sodium carbonate.

6. A method in accordance with claim 1 wherein the said isomeric mixture of dichlorophenols is in solution in a hydrocarbon or butyl acetate, the concentration of dichlorophenols in the solvent being from 5%–60% by weight.

7. A method according to claim 1, in which said contacting is effected countercurrently in a packed column.

8. A method according to claim 1, in which said contacting is effected in a vessel through which the aqueous alkaline solution and the dichlorophenol phase flow countercurrently in a substantially horizontal direction, the vessel being provided with means which brings the aqueous and dichlorophenol phases into repeated contact by carrying portions of the heavier of the two phases up into contact with the lighter of the two phases.

9. A method of obtaining an enrichment of 2,6-dichlorophenol over 2,3-dichlorophenol in a mixture comprising said isomeric dichlorophenols which comprise contacting the mixture with an aqueous alkaline solution of a caustic alkali in a concentration of 2.5%–60% by weight of the solution or with an aqueous alkaline solution of a salt of the class of carbonates, phosphates, acetates, silicates or borates of a metal of Group I or II of a Periodic Chart of the Elements in a concentration of 5%–60% by weight of the solution, the contacting being carried out at a temperature range of 0°–100° C., whereby the 2,6-dichlorophenol is preferentially extracted into the aqueous alkaline solution.

10. A method in accordance with claim 9 wherein the said 2,6-dichlorophenol present in the aqueous alkaline solution is recovered by acidification and subsequent filtration.

11. A method in accordance with claim 9 wherein the said 2,6-dichlorophenol present in the aqueous alkaline solution is recovered by extraction with methyl isobutyl ketone or with butyl acetate.

12. A method in accordance with claim 9 wherein the said aqueous alkaline solution is an aqueous solution of sodium hydroxide.

13. A method in accordance with claim 9 wherein the said aqueous alkaline solution is a 5%–12.5% by weight aqueous solution of sodium carbonate.

14. A method in accordance with claim 9 wherein the said isomeric mixture of dichlorophenols is in solution in hydrocarbon or butyl acetate, the concentration of dichlorophenols in the solvent being from 5%–60% by weight.

15. A method in accordance with claim 9 wherein the said contacting is effected in a vessel through which the aqueous alkaline solution and the dichlorophenol phase flow countercurrently in a substantially horizontal direction, the vessel being provided with means which brings the aqueous and dichlorophenol phases into repeated contact by carrying portions of the heavier of the two phases up into contact with the lighter of the two phases.

References Cited

UNITED STATES PATENTS

| | | | |
|---|---|---|---|
| 2,854,488 | 9/1958 | Widiger | 260—623 R |
| 2,732,393 | 1/1956 | Hardy | 260—457 |
| 2,708,209 | 5/1955 | Nicolassen et al. | 260—623 R |
| 3,336,400 | 8/1967 | Bradley | 260—623 R |
| 3,499,045 | 3/1970 | Cleary | 260—623 R |

FOREIGN PATENTS

| | | | |
|---|---|---|---|
| 584,662 | 10/1959 | Canada | 260—623 R |
| 697,476 | 8/1953 | Great Britian | 260—624 A |

BERNARD HELFIN, Primary Examiner

W. B. LONE, Assistant Examiner